UNITED STATES PATENT OFFICE.

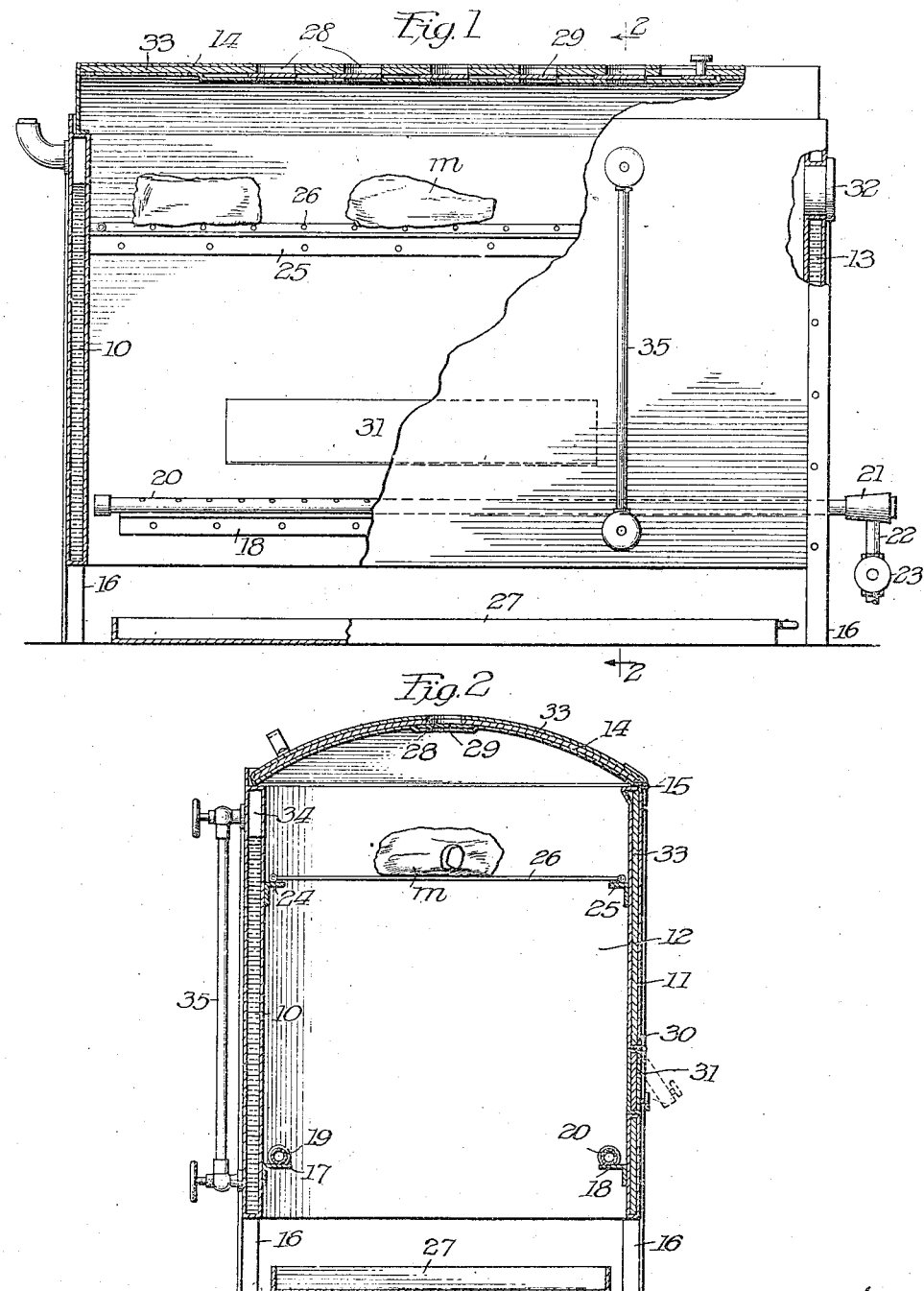

BRUNO KAHN, OF CHICAGO, ILLINOIS, ASSIGNOR TO FRED C. HESS, OF CHICAGO, ILLINOIS.

OVEN.

1,241,521.  Specification of Letters Patent.  Patented Oct. 2, 1917.

Application filed July 13, 1916. Serial No. 108,981.

*To all whom it may concern:*

Be it known that I, BRUNO KAHN, a citizen of the United States, and a resident of Chicago, in the county of Cook and State of Illinois, have invented certain new and useful Improvements in Ovens, of which the following is a specification.

My invention relates to an improved oven which is particularly adaptable for roasting and baking, the object of the invention being to provide improved construction, arrangement and operation which will produce more uniform baking or roasting with less loss of weight or shrinkage and with comparatively little fuel consumption.

I shall first describe my improved structure and then point out its distinguishing features. On the accompanying drawing—

Figure 1 is a side elevational view partly in vertical section, and

Fig. 2 is a sectional view on plane 2—2, Fig. 1.

In the structure shown the rectangular body comprises side and end walls 10, 11, 12 and 13, a cover 14 being provided and preferably hinged to one of the walls as indicated at 15. The bottom of the body is entirely open for the free passage of air, the body being set up on legs 16. Near the bottom and on opposite walls supporting ledges 17 and 18 are provided for burner tubes 19 and 20 which extend lengthwise through the body from the burner heads 21. As shown these heads are connected with gas supply piping 22 controlled by valve 23. In the upper end of the body the ledges 24 and 25 are secured to the opposite walls for supporting a grid 26 on which is laid the meat or other material $m$ to be baked or roasted. Below the bottom of the body is the drip pan 27.

The cover 14 is domed transversely to form a concave inner deflecting surface, and along its central longitudinal line it has a plurality of openings 28 controlled by a slide damper 29. In one of the walls parallel with the burners a horizontal opening 30 is provided above the level of the burners to be controlled by a door 31. In one of the walls adjacent the grid a thermometer 32 may be inserted to indicate the temperature.

As shown, the side wall 11 and the cover are double walled and filled with heat insulating material 33 such as asbestos. The other walls 10, 12 and 13 are double walled to form inter-communicating water space 34 so that the oven is water-jacketed on three sides and asbestos-filled at the other wall and the cover. Therefore, the water-jacketed walls will present cooling or condensing surfaces and the other walls will be dry and highly heated. A water gage 35 indicates the level of water in the water space.

Describing now the operation, when the burners are lighted air will enter at the bottom of the oven below the burners and as it is heated it will rise to the top and will be deflected toward the center of the oven by the curved cover and will flow downwardly and out again at the bottom of the oven. Any excess moisture in the air will be condensed against the cool water-jacketed surfaces to be taken up again by the air as required. On account of such condensation the air flowing up along the water-jacketed walls will be cooler than the air near the unjacketed-wall 11 but at the top of the oven they will mix and intermingle and will circulate about the material to effect uniform baking or roasting and will then pass out of the oven at the bottom. There will be just sufficient moisture in the mixture to prevent the moisture and juices in the meat from being driven out by the heat thereby preventing shrinkage and loss in weight. If high heat is desired the vent openings 28 in the cover are closed and the air door 31 is closed so that all the heat will pass upwardly and downwardly through the oven and around the material to be treated. If less heat is desired, the damper 29 can be adjusted to open the vents 28 accordingly so that part of the heat can escape at the upper end of the oven, or the door 31 can be opened to permit cool air to flow into the oven above the burners to mingle with the heated air to keep it from becoming too hot. By turning on the gas as desired and by adjusting the door and the vents the oven can be regulated to a nicety to bake or roast under different degrees of heat, or to bake or roast rapidly or more slowly depending upon the nature of the material treated. Instead of gas electricity could be used for heating the oven.

The oven of my invention is extremely simple in construction and arrangement and when the cover is thrown back the grid can be removed and the body part is entirely free to be thoroughly cleaned and kept in sanitary condition. Any drippings from the material treated will fall into the pan 27 which can readily be removed and cleaned.

I do not, of course, desire to be limited to the exact construction, arrangement and operation shown and described, as changes and modifications may be possible which would still come within the scope of the invention. I claim the following:

1. In an oven of the class described, the combination of a rectangular body part entirely open at its lower end to the air, a cover for the top of said body part, the front and end walls of said body part being water-jacketed and the rear wall and said cover being unjacketed, a burner adjacent the front wall near the lower end thereof, a burner adjacent the rear wall near the lower end thereof, a support above the burners for material to be treated, adjustable vent openings in the cover, and an adjustable air inlet to the body part above the level of the burners.

2. In an oven of the class described, the combination of a rectangular body part entirely open at its lower end to the air, a cover for the top of said body part, the front and end walls of said body part being water-jacketed and the rear wall and said cover being unjacketed, a burner adjacent the front wall near the lower end thereof, a burner adjacent the rear wall near the lower end thereof, and a support above the burners for material to be treated.

3. In an oven of the class described, the combination of a rectangular body part entirely open at its lower end and having a cover concave on its inside, a support at the top of the body part for material to be treated, one wall of said body part being water-jacketed and the opposite wall being unjacketed, a gas burner running alongside of the jacketed wall near the lower end thereof, another gas burner running alongside of the opposite wall near the lower end thereof, said burners being sufficiently far apart so that the heated air rising above the one burner will absorb moisture of condensation from the jacketed wall and the dry heated air above the opposite burner will rise and mingle at the top of the body part with the moist heated air, and the mixture then flowing downwardly through the body part and out from the bottom thereof after having circulated about the material at the top of the body part to be treated.

In witness whereof I hereunto set my hand this 10th day of July, A. D. 1916.

BRUNO KAHN.

Copies of this patent may be obtained for five cents each, by addressing the "Commissioner of Patents, Washington, D. C."